United States Patent
Wu et al.

(10) Patent No.: US 11,758,413 B2
(45) Date of Patent: Sep. 12, 2023

(54) ROADSIDE APPARATUS AND COMMUNICATION BEAM POINTING DIRECTION ADJUSTING METHOD THEREOF

(71) Applicant: PEGATRON CORPORATION, Taipei (TW)

(72) Inventors: Fangming Wu, Taipei (TW); Li-Kang Yen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 208 days.

(21) Appl. No.: 17/383,266

(22) Filed: Jul. 22, 2021

(65) Prior Publication Data

US 2022/0095124 A1    Mar. 24, 2022

(30) Foreign Application Priority Data

Sep. 24, 2020   (TW) ................................ 109133032

(51) Int. Cl.
*H04W 16/28*   (2009.01)
*G06K 7/10*    (2006.01)
*H04W 4/40*    (2018.01)

(52) U.S. Cl.
CPC ........ *H04W 16/28* (2013.01); *G06K 7/10366* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2015/0262442 A1* | 9/2015 | Chen .................. | G07C 9/00309 340/5.72 |
| 2016/0269070 A1 | 9/2016 | Oliaei | |
| 2017/0032666 A1* | 2/2017 | Pretorius .............. | G08G 1/0116 |
| 2019/0019362 A1 | 1/2019 | Gravelle et al. | |
| 2019/0079176 A1* | 3/2019 | Weissman ............ | H04B 17/318 |
| 2020/0236495 A1 | 7/2020 | Lee et al. | |
| 2020/0311743 A1* | 10/2020 | Higuchi ................. | G06V 20/62 |
| 2022/0018948 A1* | 1/2022 | Megerdichian ......... | G01S 7/411 |

FOREIGN PATENT DOCUMENTS

| | | |
|---|---|---|
| CN | 102339374 | 2/2012 |
| CN | 102394340 | 3/2012 |

* cited by examiner

*Primary Examiner* — Saumit Shah
(74) *Attorney, Agent, or Firm* — J.C. PATENTS (57) ABSTRACT

A roadside apparatus and a communication beam pointing direction adjusting method thereof are provided. A first radio frequency identification reader detects a first response signal of a wireless identification tag of a first mobile vehicle to obtain first signal strength information. The first signal strength information corresponds to strength of the first response signal. A first roadside unit determines a position of the first mobile vehicle according to the first signal strength information, and directs a communication beam of the first roadside unit to the first mobile vehicle.

12 Claims, 8 Drawing Sheets

Receive first signal strength information, wherein the first signal strength information is obtained by a first RFID reader according to a first response signal of a wireless identification tag of a first mobile vehicle —S602

Determine the position of the first mobile vehicle according to the first signal strength information to obtain mobile vehicle status information, and direct a communication beam to the first mobile vehicle according to the mobile vehicle status information —S604

ROADSIDE APPARATUS AND COMMUNICATION BEAM POINTING DIRECTION ADJUSTING METHOD THEREOF

CROSS-REFERENCE TO RELATED APPLICATION

This application claims the priority benefit of Taiwan application serial no. 109133032, filed on Sep. 24, 2020. The entirety of the above-mentioned patent application is hereby incorporated by reference herein and made a part of this specification.

BACKGROUND

Technical Field

The disclosure relates to a communication device, and more particularly to a roadside apparatus and a communication beam pointing direction adjusting method thereof.

Description of Related Art

In recent years, due to considerations such as autonomous technology and driving safety, the vehicle to everything (V2X) has become one of the popular research and development projects. The core technology of the V2X is based on wireless communication to implement various data transmission and communication in the transportation system, and most applications thereof are to share information with the participants through vehicles and road facilities.

Millimeter wave beamforming technology may broadcast transmit signals in different antenna beam directions at different times, and receive and estimate the quality indicators of the signals received in different directions to determine the final antenna beam communication pointing direction. However, in general actual conditions, since the movement speed of the car is often as high as tens of kilometers and may even reach hundred kilometers level on high-speed sections, the issue of time-varying communication channel is even more severe. Therefore, how to effectively maintain the communication quality has become one of the major breakthrough targets for the V2X wireless technology.

Generally, although the singular value decomposition method may be used to improve the communication quality of the V2X, the method needs to set a larger number of antennas on the vehicle and perform complex mathematical computation on the received signals to obtain a better result. Therefore, there are issues of excessive hardware cost and being unable to immediately adjust the communication beam pointing direction of the antennas.

SUMMARY

The disclosure provides a communication beam pointing direction adjusting method of a roadside apparatus, which can effectively reduce the hardware cost and improve the communication quality.

The roadside apparatus of the disclosure includes a first wireless radio frequency identification reader and a first roadside unit. The first radio frequency identification reader detects a first response signal of a wireless identification tag of a first mobile vehicle to obtain first signal strength information. The first signal strength information corresponds to strength of the first response signal. The first roadside unit is coupled to the first radio frequency identification reader, determines a position of the first mobile vehicle according to the first signal strength information, and directs a communication beam of the first roadside unit to the first mobile vehicle.

In an embodiment of the disclosure, the first radio frequency identification reader further obtains identification information of the first mobile vehicle according to the first response signal, and the first roadside unit further identifies the first mobile vehicle according to the identification information of the first mobile vehicle.

In an embodiment of the disclosure, the roadside apparatus further includes a second radio frequency identification reader coupled to the first roadside unit. The second radio frequency identification reader detects a second response signal of the radio identification tag of the first mobile vehicle to obtain the identification information and second signal strength information of the first mobile vehicle. The second signal strength information corresponds to strength of the second response signal. The first roadside unit identifies the first mobile vehicle and determines the position of the first mobile vehicle according to the identification information, the first signal strength information, and the second signal strength information of the first mobile vehicle.

In an embodiment of the disclosure, the first roadside unit further obtains mobile vehicle status information according to the first signal strength information. The mobile vehicle status information includes at least one of the position and a movement speed of the first mobile vehicle. The movement speed is obtained by dividing a positional change of the first mobile vehicle by an elapsed time. The roadside apparatus further includes a second roadside unit coupled to the first roadside unit. The first roadside unit further transmits the identification information and the mobile vehicle status information of the first mobile vehicle to the second roadside unit. The second roadside unit identifies the first mobile vehicle and predicts a movement status of the first mobile vehicle according to the identification information and the mobile vehicle status information of the first mobile vehicle, and directs a communication beam of the second roadside unit to the first mobile vehicle according to a prediction result of the movement status of the first mobile vehicle.

In an embodiment of the disclosure, the first roadside unit compares the first signal strength information with at least one signal strength preset value, and determines the position of the first mobile vehicle according to a comparison result.

In an embodiment of the disclosure, the first radio frequency identification reader further detects a second response signal of a wireless identification tag of a second mobile vehicle to obtain second signal strength information. The second signal strength information corresponds to strength of the second response signal. The first roadside unit further determines a position of the second mobile vehicle according to the second signal strength information, directs the communication beam of the first roadside unit to the second mobile vehicle, and allocates communication bandwidths to the first mobile vehicle and the second mobile vehicle.

The disclosure also provides a communication beam pointing direction adjusting method of a roadside apparatus, which includes the following steps. First signal strength information obtained by a first radio frequency identification reader detecting a first response signal of a wireless identification tag of a first mobile vehicle is received. The first signal strength information corresponds to strength of the first response signal. A position of the first mobile vehicle is determined according to the first signal strength information, and a communication beam is directed to the first mobile vehicle.

In an embodiment of the disclosure, the communication beam pointing direction adjusting method of the roadside apparatus includes the following steps. Identification information of the first mobile vehicle obtained by the first radio frequency identification reader according to the first response signal is received. The first mobile vehicle is identified according to the identification information of the first mobile vehicle.

In an embodiment of the disclosure, the communication beam pointing direction adjusting method of the roadside apparatus includes the following steps. Mobile vehicle status information is obtained according to the first signal strength information. The mobile vehicle status information includes at least one of the position and a movement speed of the first mobile vehicle. The movement speed is obtained by dividing a positional change of the first mobile vehicle by an elapsed time. The identification information and the mobile vehicle status information of the first mobile vehicle are transmitted to a roadside unit. The roadside unit identifies the first mobile vehicle and predicts a movement status of the first mobile vehicle according to the identification information and the mobile vehicle status information of the first mobile vehicle, and directs a communication beam of the roadside unit to the first mobile vehicle according to a prediction result of the movement status of the first mobile vehicle.

In an embodiment of the disclosure, the communication beam pointing direction adjusting method of the roadside apparatus includes the following steps. The identification information and second signal strength information of the first mobile vehicle obtained by a second radio frequency identification reader detecting a second response signal of the wireless identification tag of the first mobile vehicle are received. The second signal strength information corresponds to strength of the second response signal. The first mobile vehicle is identified and the position of the first mobile vehicle is determined according to the identification information, the first signal strength information, and the second signal strength information of the first mobile vehicle.

In an embodiment of the disclosure, the communication beam pointing direction adjusting method of the roadside apparatus includes the following step. The first signal strength information is compared with at least one signal strength preset value, and the position of the first mobile vehicle is determined according to a comparison result.

In an embodiment of the disclosure, the communication beam pointing direction adjusting method of the roadside apparatus includes the following steps. Second signal strength information obtained by the first radio frequency identification reader detecting a second response signal of a wireless identification tag of a second mobile vehicle is received. The second signal strength information corresponds to strength of the second response signal. A position of the second mobile vehicle is determined according to the second signal strength information, and the communication beam is directed to the second mobile vehicle. Communication bandwidths are allocated to the first mobile vehicle and the second mobile vehicle.

Based on the above, the embodiments of the disclosure use the radio frequency identification reader to detect the response signal of the wireless identification tag of the mobile vehicle. The roadside unit may determine the position of the mobile vehicle according to the signal strength information of the response signal, and immediately direct the communication beam to the mobile vehicle, so that the hardware cost can be effectively reduced and the communication quality can be greatly improved.

In order for the features and advantages of the disclosure to be more comprehensible, the following specific embodiments are described in detail in conjunction with the accompanying drawings.

DETAILED DESCRIPTION OF DISCLOSED EMBODIMENTS

In order for the content of the disclosure to be more comprehensible, the embodiments are specifically listed below as examples on which the disclosure may indeed be implemented. In addition, wherever possible, elements/components/steps with the same reference numerals in the drawings and implementation manners represent the same or similar parts. In addition, the term "coupling" used in the specification may be "indirect coupling" or "direct coupling".

Figure 1:
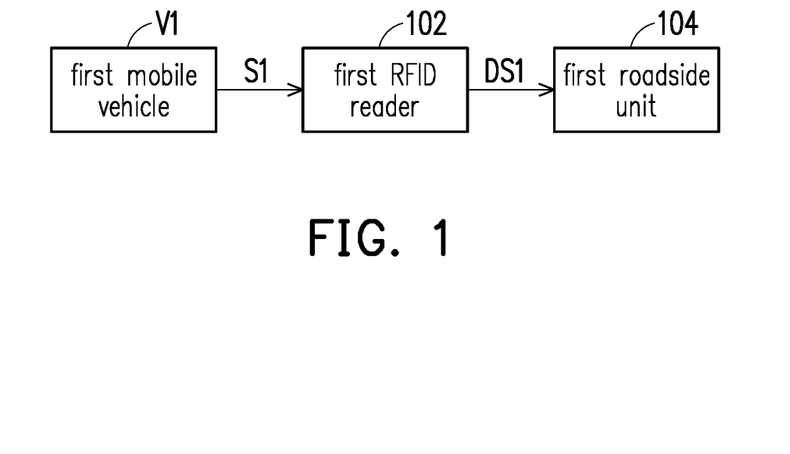
FIG. 1 is a schematic diagram of a roadside apparatus according to an embodiment of the disclosure.

FIG. 1 is a schematic diagram of a roadside apparatus according to an embodiment of the disclosure. Please refer to FIG. 1. The roadside apparatus includes a first radio frequency identification (RFID) reader 102 and a first roadside unit (RSU) 104. The first RFID reader 102 may be coupled to the first roadside unit 104 in a wired or wireless manner. The first RFID reader 102 may send a radio frequency signal to a wireless identification tag (not shown) on a first mobile vehicle V1, and receive a first response signal S1 from the wireless identification tag to obtain first signal strength information DS1 according to signal strength of the first response signal S1. The first signal strength information may be a received signal strength indication (RSSI) value. The first roadside unit 104 may determine a position of the first mobile vehicle V1 according to the first signal strength information DS1, and direct a communication beam of the first roadside unit 104 to the first mobile vehicle V1 to communicate with an on board unit (OBU) (not shown) on the first mobile vehicle V1, thereby implementing various applications of the vehicle to everything (V2X).

The manner for the first roadside unit 104 to determine the position of the first mobile vehicle V1 may be, for example, to compare the signal strength of the first response signal S1 with a signal strength preset value according to the first signal strength information DS1. When the signal strength of the first response signal S1 is higher than the signal strength preset value, it represents that the first mobile vehicle V1 has moved to the position corresponding to the first RFID reader 102. The first roadside unit 104 may direct the communication beam to the first mobile vehicle V1 according to the comparison result to communicate with the first mobile vehicle V1.

Figure 2:
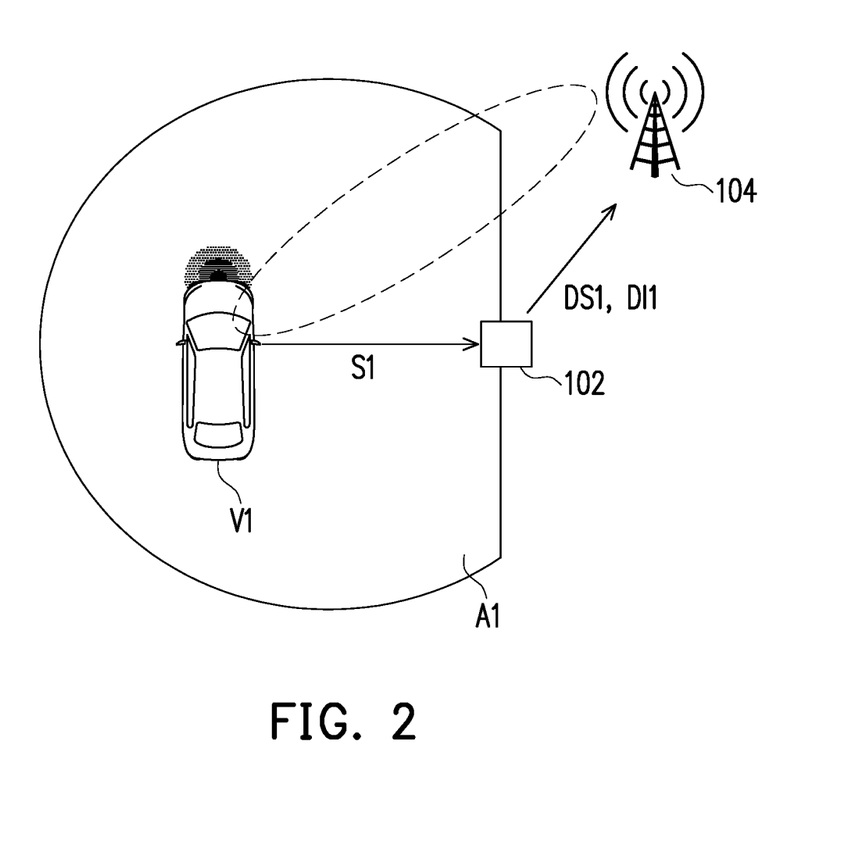
FIG. 2 is a schematic diagram of a roadside apparatus according to another embodiment of the disclosure.

In some embodiments, the first roadside unit 104 may compare the signal strength of the first response signal S1 with multiple signal strength preset values according to the first signal strength information DS1 to obtain the position of the first mobile vehicle V1 relative to the first RFID reader 102, and obtain the positional change of the first mobile vehicle V1 relative to the first RFID reader 102 over time, so as to calculate the movement speed of the first mobile vehicle V1. For example, in FIG. 2, it is assumed that the first roadside unit 104 compares the signal strength of the first response signal S1 with a first signal strength preset value and a second signal strength preset value. The first signal strength preset value is greater than the second signal strength preset value. When the first mobile vehicle V1 just enters a sensing range A1 of the first RFID reader 102, the signal strength of the first response signal S1 received by the first RFID reader 102 is smaller. At this time, the signal strength of the first response signal S1 is less than the first signal strength preset value and greater than the second signal strength preset value. When the first mobile vehicle V1 completely enters the sensing range A1 of the first RFID reader 102 (as shown in FIG. 2), the signal strength of the first response signal S1 received by the first RFID reader 102 is greater than the first signal strength preset value. In this way, the first roadside unit 104 may obtain mobile vehicle status information such as the position and the movement speed of the first mobile vehicle V1 according to the comparison result of the signal strength of the first response signal S1 with the first signal strength preset value and the second signal strength preset value. The position of the first mobile vehicle V1 may be obtained by the comparison result of the signal strength of the first response signal S1 with the signal strength preset value, and the movement speed may be calculated by dividing the positional change of the first mobile vehicle V1 over time by the elapsed time. In addition, in the embodiment of FIG. 2, the first response signal S1 may include identification information DI1 (for example, electronic product code (EPC)) for identifying the first mobile vehicle V1. The first roadside unit 104 may identify the first mobile vehicle V1 according to the identification information DI1 to ensure that the communication beam is correctly directed to the first mobile vehicle V1.

In this way, for the determination of the position of the first mobile vehicle V1 according to the signal strength information of the first response signal S1 provided by the first RFID reader 102, there is no need to set multiple antennas on the first mobile vehicle V1 and perform complex mathematical computation as in the prior art. Therefore, the hardware cost can be effectively reduced. The position of the first mobile vehicle V1 may be immediately located, and the communication beam of the first roadside unit 104 is directed to the first mobile vehicle V1, thereby greatly improving the communication quality.

Figure 3:
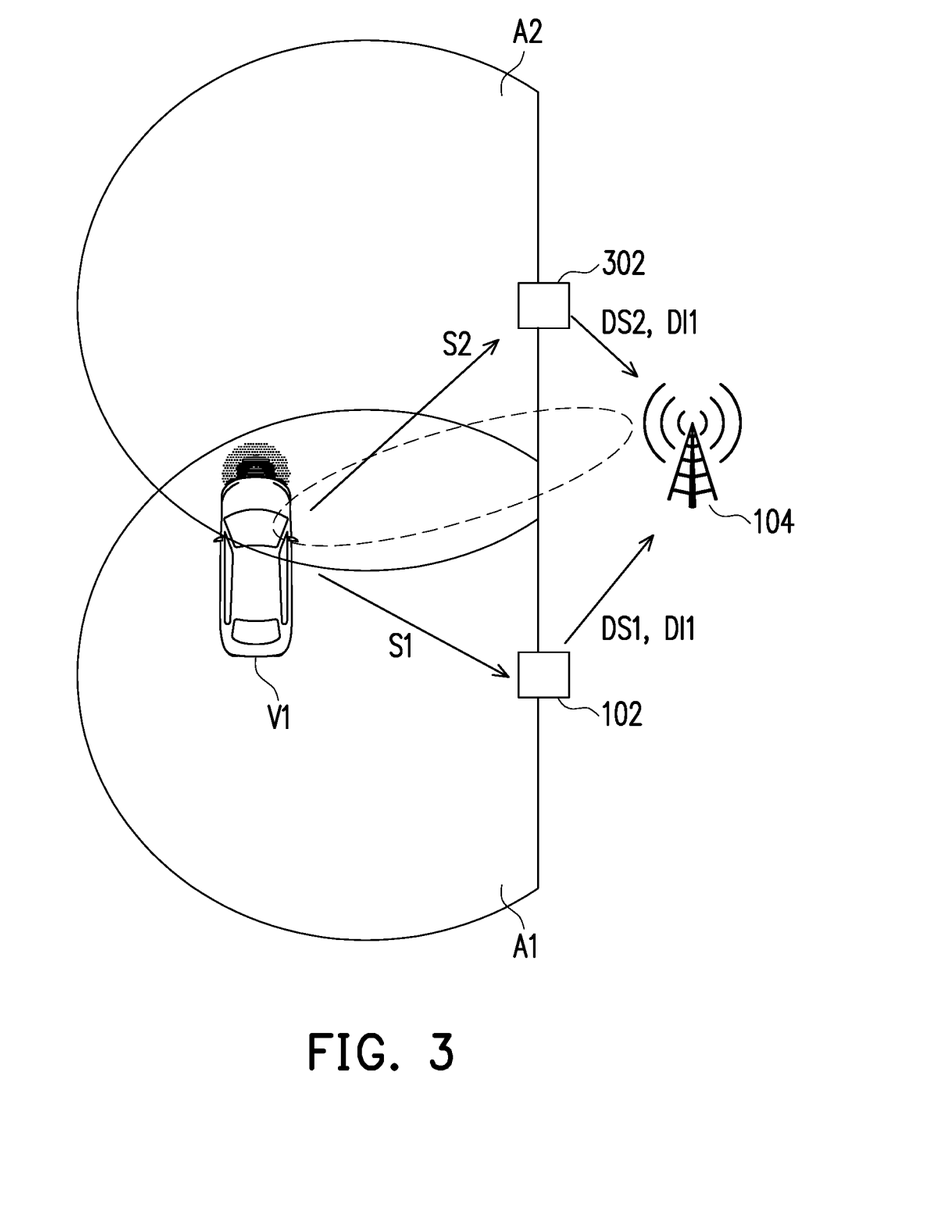
FIG. 3 is a schematic diagram of a roadside apparatus according to another embodiment of the disclosure.

FIG. 3 is a schematic diagram of a roadside apparatus according to another embodiment of the disclosure. In this embodiment, in addition to the first RFID reader 102 and the first roadside unit 104, the roadside apparatus may also include a second RFID reader 302. Similar to the first RFID reader 102, the second RFID reader 302 is coupled to the first roadside unit 104 and may also send a radio frequency signal to the wireless identification tag on the first mobile vehicle V1 and receive a second response signal S2 from the wireless identification tag to obtain second signal strength information DS2 according to signal strength of the second response signal S2, and transmit the second signal strength information DS2 and the identification information DI1 of the first mobile vehicle V1 included in the second response signal S2 to the first roadside unit 104. As shown in FIG. 3, when the first mobile vehicle V1 is located in the sensing range A1 of the first RFID reader 102 and a sensing range A2 of the second RFID reader 302 at the same time, the first roadside unit 104 may determine the position of the first mobile vehicle V1 according to the identification information DI1, the first signal strength information DS1, and the second signal strength information DS2 provided by the first RFID reader 102 and the second RFID reader 302. For example, algorithms such as three-point fix method or particle filter may be used to determine the position of the first mobile vehicle V1. In addition, according to the position of the first mobile vehicle V1 determined at different times, the movement speed of the first mobile vehicle V1 may be calculated by dividing the positional change by the elapsed time. In this way, the positional change of the first mobile vehicle V1 may be more accurately tracked, thereby more accurately directing the communication beam of the first roadside unit 104 to the first mobile vehicle V1. It is worth noting that in some embodiments, the number of RFID readers corresponding to the first roadside unit 104 is not limited to this embodiment. The first roadside unit 104 may also determine the position of the first mobile vehicle V1 according to the identification information and the signal strength information provided by more RFID readers, thereby improving the accuracy of determining the position of the first mobile vehicle V1.

Figure 4:
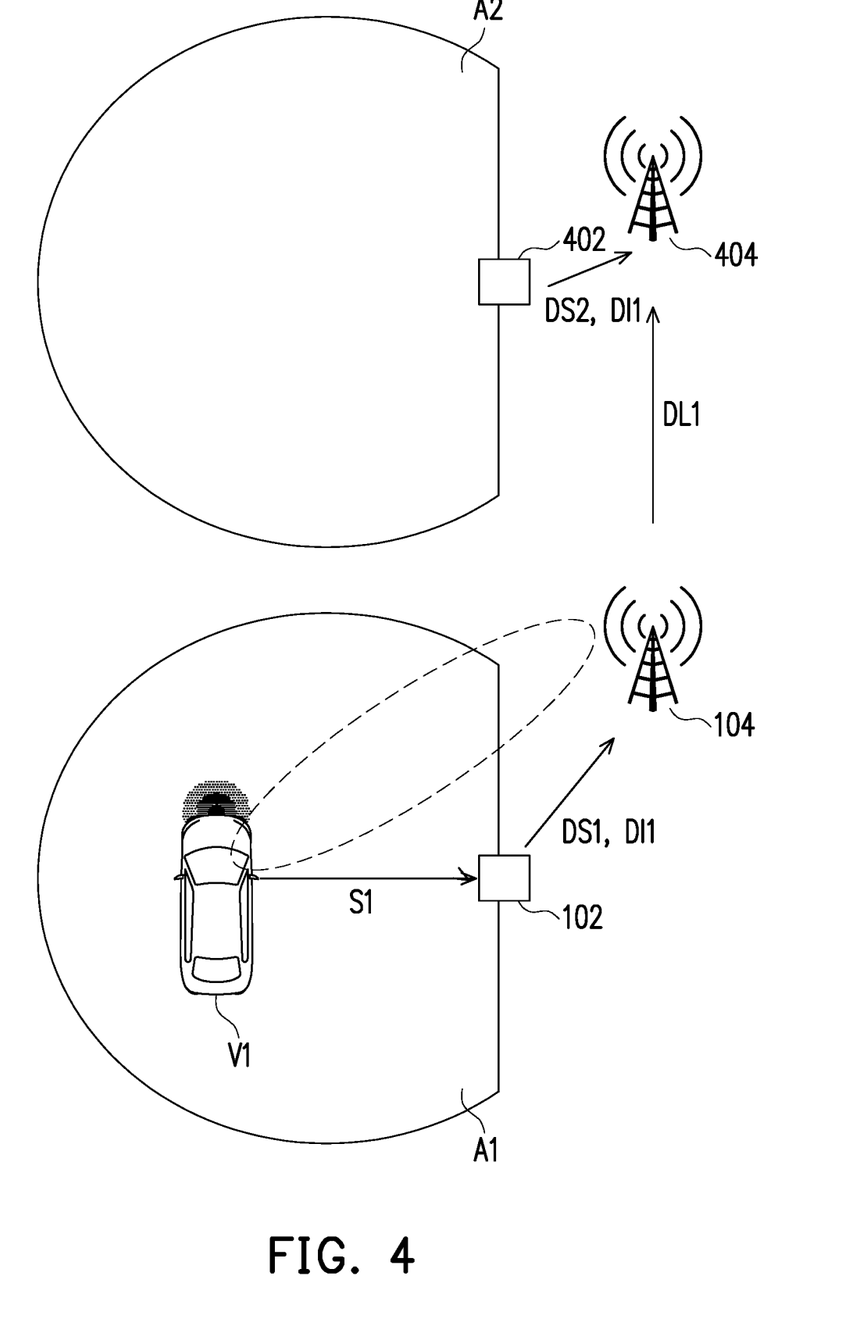
FIG. 4 is a schematic diagram of a roadside apparatus according to another embodiment of the disclosure.

FIG. 4 is a schematic diagram of a roadside apparatus according to another embodiment of the disclosure. In this embodiment, in addition to the first RFID reader 102 and the first roadside unit 104, the roadside apparatus may also include a second RFID reader 402 and a second roadside unit 404. The second roadside unit 404 may be coupled to the second RFID reader 402 and the first roadside unit 104 in a wired or wireless manner. The actions of the second RFID reader 402 and the second roadside unit 404 are similar to those of the first RFID reader 102 and the first roadside unit 104 in the above embodiment, which will not be repeated here. After obtaining the mobile vehicle status information of the first mobile vehicle V1 according to the identification information DI1 and the first signal strength information DS1 provided by the first RFID reader 102, the first roadside unit 104 of this embodiment may transmit the identification information DI1 and mobile vehicle status information DL1 of the mobile vehicle V1 to the second roadside unit 404. The mobile vehicle status information of the first mobile vehicle V1 may be the position and the movement speed of the first mobile vehicle V1 obtained, for example, in the manner of the embodiment of FIG. 2. In this way, the second roadside unit 404 may identify the first mobile vehicle V1 according to the identification information DI1 and the mobile vehicle status information DL1 of the first mobile vehicle V1 and predict the movement status of the first mobile vehicle V1 (for example, predict the time point and the corresponding position of the first mobile vehicle V1 entering the sensing range A2 of the second RFID reader 402), and direct the communication beam to the first mobile vehicle V1 according to the prediction result. In other embodiments, the first roadside unit 104 may also correspond to 2 RFID readers as shown in the embodiment of FIG. 3, and the position and the movement speed of the first mobile vehicle V1 are determined according to the identification information and the signal strength information provided by the two readers. The implementation manner thereof has been described in the embodiment of FIG. 3, which will not be repeated here.

In some embodiments, the second roadside unit 404 not only adjusts the communication beam pointing direction according to the identification information DI1 and the mobile vehicle status information DL1, but also assists the correction of the communication beam pointing direction of the second roadside unit 404 according to the identification information DI1 and the second signal strength information DS2 provided by the second RFID reader 402.

The second roadside unit 404 may, for example, be the next or the next next roadside unit adjacent to the first roadside unit 104 in the movement direction of the first mobile vehicle V1, but not limited thereto. The first roadside unit 104 may determine an object for sharing the identification information DI1 and the mobile vehicle status information DL1 according to actual requirements and signal transmission capabilities. In addition, in some embodiments, the second roadside unit 404 may receive the identification information DI1 and the mobile vehicle status information DL1 provided by multiple roadside units, so as to determine the movement status of the first mobile vehicle V1, so that the second roadside unit 404 may more accurately predict the movement status of the first mobile vehicle V1, which is not limited to this embodiment that only receives the identification information DI1 and the mobile vehicle status information DL1 from the first roadside unit 104.

Figure 5:
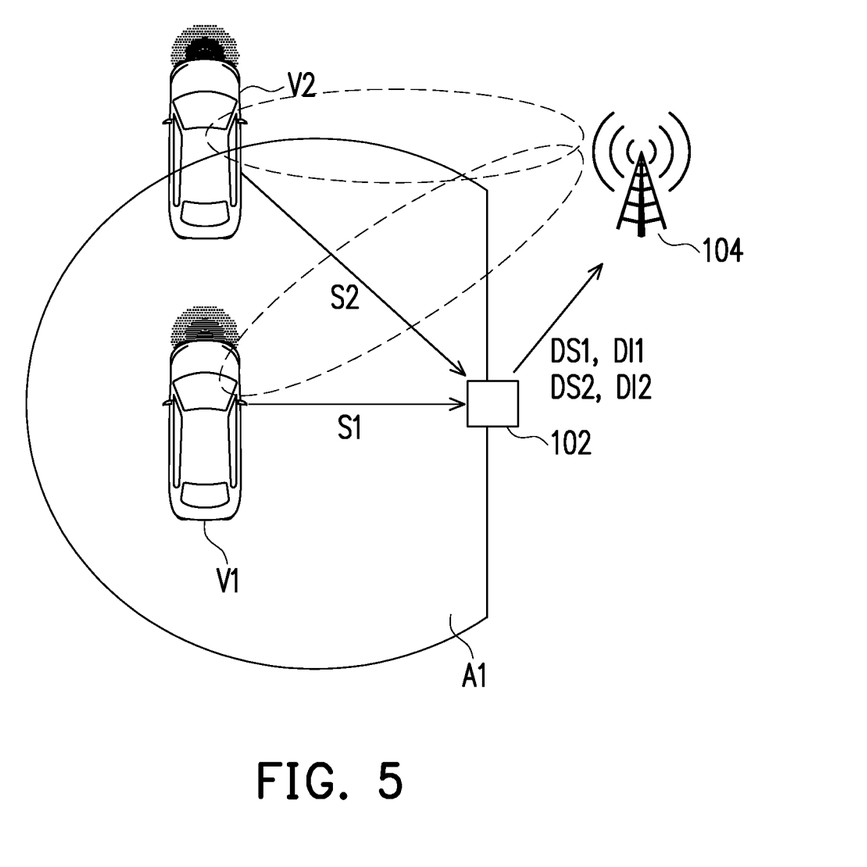
FIG. 5 is a schematic diagram of a roadside apparatus according to another embodiment of the disclosure.

FIG. 5 is a schematic diagram of a roadside apparatus according to another embodiment of the disclosure. In this embodiment, the sensing range A1 of the first RFID reader 102 includes the first mobile vehicle V1 and the second mobile vehicle V2. The first RFID reader 102 may receive the first response signal S1 and the second response signal S2 from the first mobile vehicle V1 and the second mobile vehicle V2, obtain the first signal strength information DS1 and the second signal strength information DS2 according to the signal strengths of the first response signal S1 and the second response signal S2, and transmit the first signal strength information DS1, the second signal strength information DS2, and the identification information DI1 and identification information DI2 of the first mobile vehicle V1 and the second mobile vehicle V2 included in the first response signal S1 and the second response signal S2 to the first roadside unit 104. The first roadside unit 104 may determine the positions of the first mobile vehicle V1 and the second mobile vehicle V2 according to the first signal strength information DS1, the second signal strength information DS2, the identification information DI1, and the identification information DI2, direct the communication beam of the first roadside unit 104 to the first mobile vehicle V1 and second mobile vehicle V2, and allocate communication bandwidths to the first mobile vehicle V1 and the second mobile vehicle V2.

Figure 6:
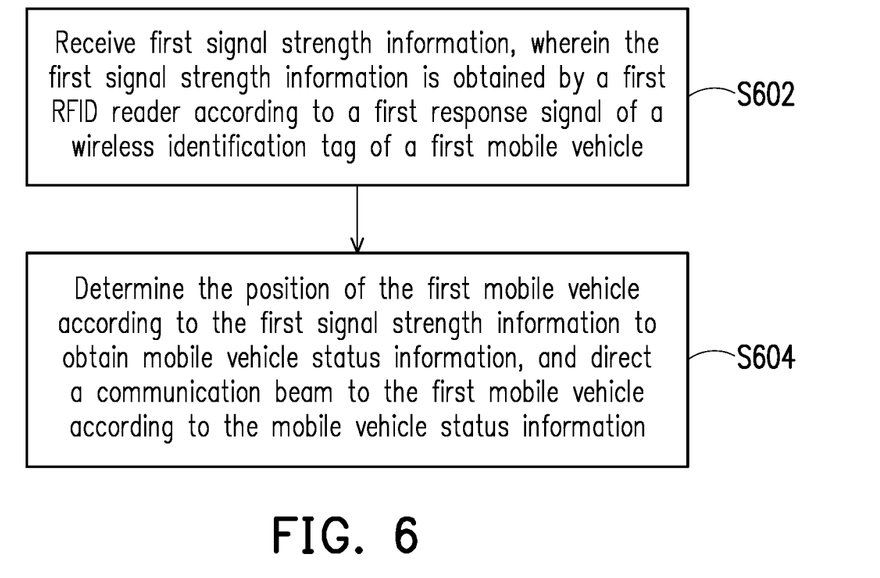
FIG. 6 is a flowchart of a communication beam pointing direction adjusting method of a roadside apparatus according to an embodiment of the disclosure.

FIG. 6 is a flowchart of a communication beam pointing direction adjusting method of a roadside apparatus according to an embodiment of the disclosure. It can be seen from the above embodiments that the communication beam pointing direction adjusting method of the roadside apparatus may include the following steps. First, first signal strength information is received. The first signal strength information is obtained by a first RFID reader according to a first response signal of a wireless identification tag of a first mobile vehicle (Step S602). The first signal strength information corresponds to strength of the first response signal. For example, the first signal strength information may be compared with at least one signal strength preset value. The position of the first mobile vehicle may be determined according to the comparison result to obtain mobile vehicle status information (for example, at least one of position information and movement speed information), and a communication beam is directed to the first mobile vehicle according to the mobile vehicle status information (Step S604).

Figure 7:
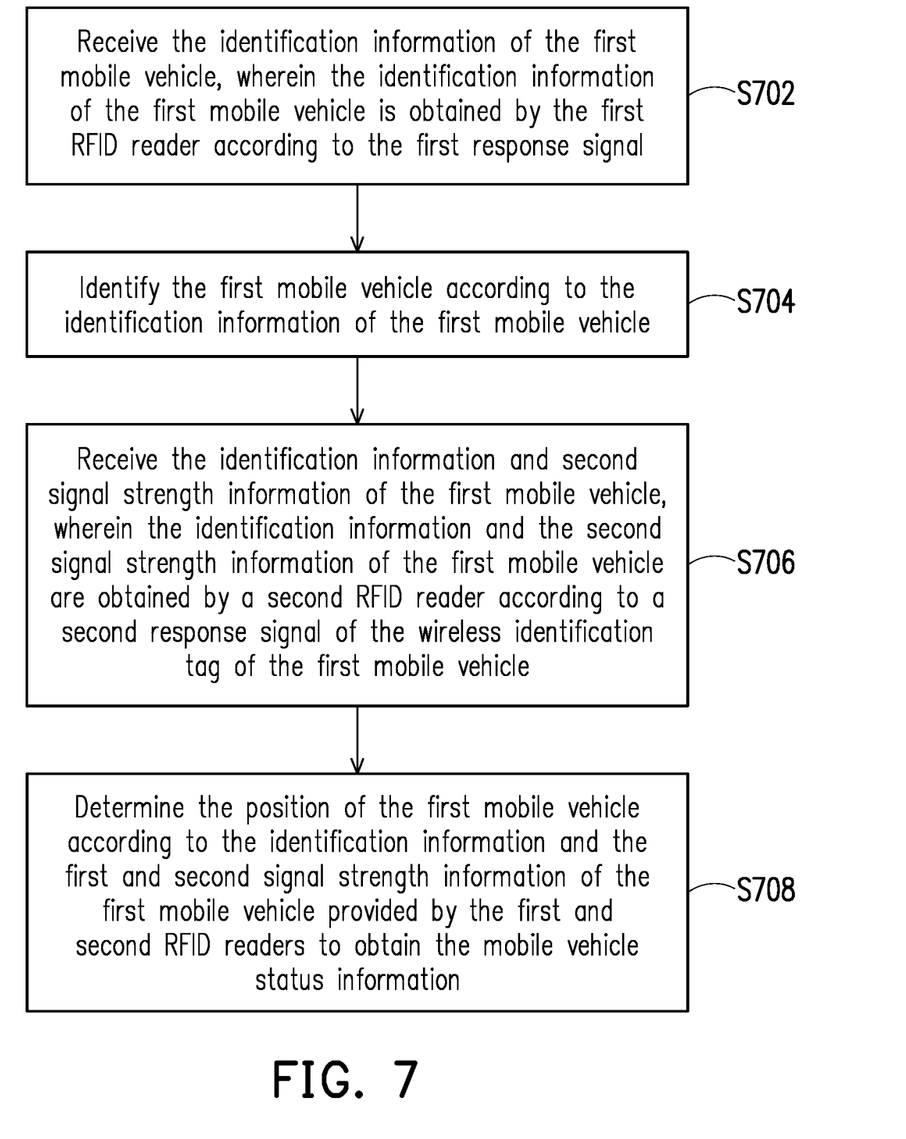
FIG. 7 is a flowchart of a communication beam pointing direction adjusting method of a roadside apparatus according to another embodiment of the disclosure.

FIG. 7 is a flowchart of a communication beam pointing direction adjusting method of a roadside apparatus according to another embodiment of the disclosure. In this embodiment, the first RFID reader may also obtain identification information for identifying the first mobile vehicle according to the first response signal. The communication beam pointing direction adjusting method may include receiving the identification information of the first mobile vehicle. The identification information of the first mobile vehicle is obtained by the first RFID reader according to the first response signal (Step S702). Then, the first mobile vehicle is identified according to the identification information of the first mobile vehicle (Step S704). After that, the identification information and second signal strength information of the first mobile vehicle may be received. The identification information and the second signal strength information of the first mobile vehicle are obtained by a second RFID reader according to a second response signal of the wireless identification tag of the first mobile vehicle (Step S706). The second signal strength information corresponds to strength of the second response signal. Then, the position of the first mobile vehicle is determined according to the identification information and the first signal strength information and the second signal strength information of the first mobile vehicle provided by the first RFID reader and the second RFID reader to obtain the mobile vehicle status information (Step S708).

Figure 8:
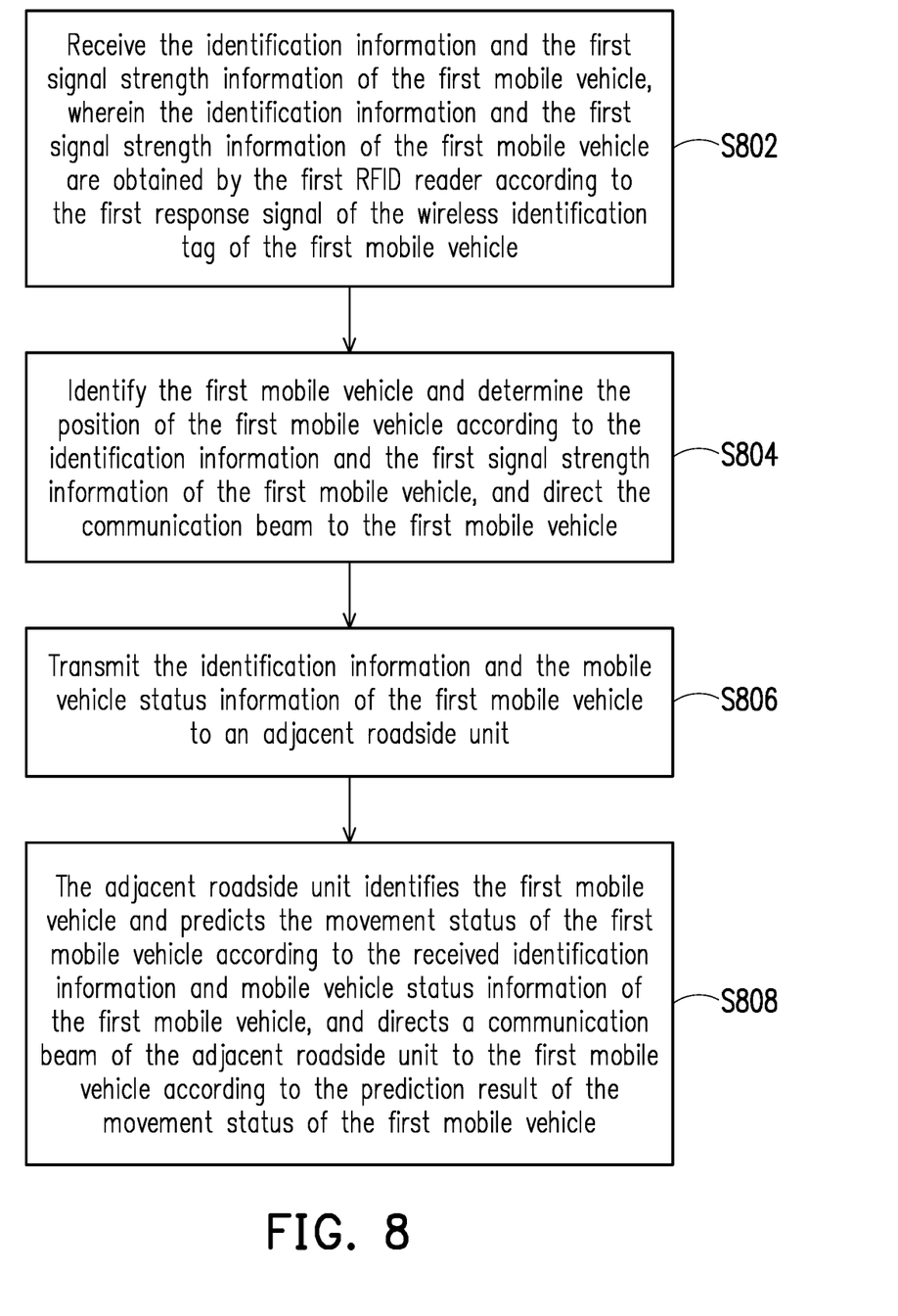
FIG. 8 is a flowchart of a communication beam pointing direction adjusting method of a roadside apparatus according to another embodiment of the disclosure.

FIG. 8 is a flowchart of a communication beam pointing direction adjusting method of a roadside apparatus according to another embodiment of the disclosure. First, the identification information and the first signal strength information of the first mobile vehicle are received. The identification information and the first signal strength information of the first mobile vehicle are obtained by the first RFID reader according to the first response signal of the wireless identification tag of the first mobile vehicle (Step S802). Then, according to the identification information and the first signal strength information of the first mobile vehicle, the first mobile vehicle is identified and the position of the first mobile vehicle is determined, and the communication beam is directed to the first mobile vehicle (Step S804). After that, the identification information and the mobile vehicle status information of the first mobile vehicle may be transmitted to an adjacent roadside unit (Step S806). In this way, the adjacent roadside unit may identify the first mobile vehicle and predict the movement status of the first mobile vehicle according to the received identification information and mobile vehicle status information of the first mobile vehicle, and direct a communication beam of the adjacent roadside unit to the first mobile vehicle according to the prediction result of the movement status of the first mobile vehicle (Step S808). It is worth noting that other than determining the position of the first mobile vehicle according to the received identification information and mobile vehicle status information of the first mobile vehicle, the roadside unit receiving the identification information and the mobile vehicle status information of the first mobile vehicle may also assist in the correction of the position of the first mobile vehicle and the communication beam pointing direction of the roadside unit according to the identification information and the first signal strength information of the first mobile vehicle provided by the corresponding first RFID reader.

Figure 9:
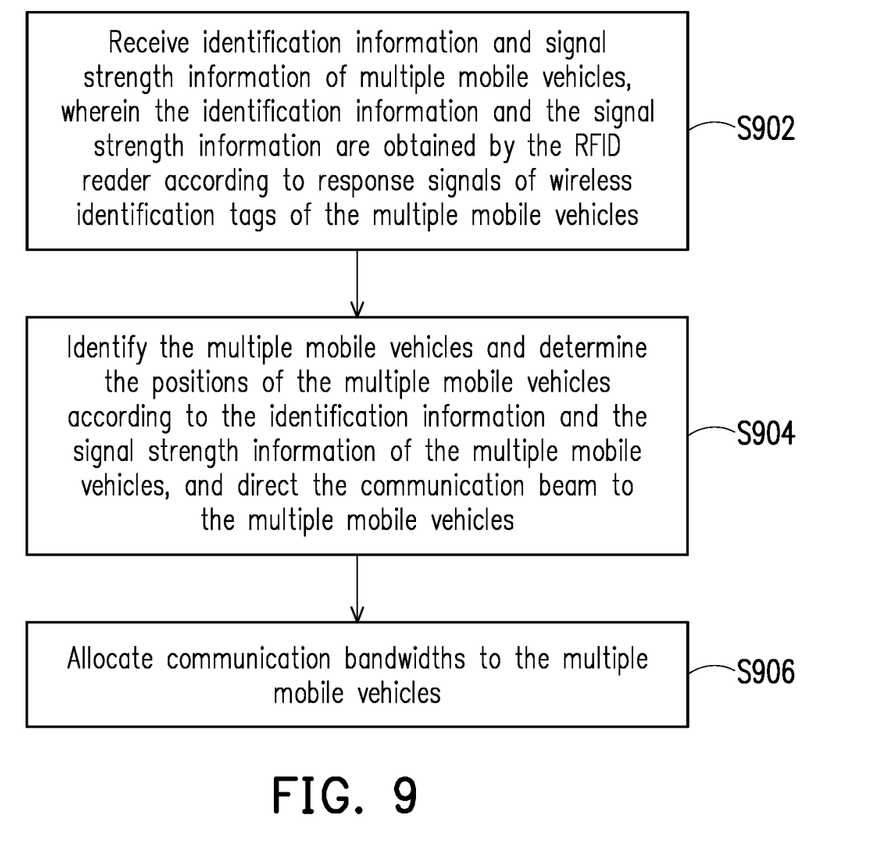
FIG. 9 is a flowchart of a communication beam pointing direction adjusting method of a roadside apparatus according to another embodiment of the disclosure.

FIG. 9 is a flowchart of a communication beam pointing direction adjusting method of a roadside apparatus according to another embodiment of the disclosure. In this embodiment, the communication beam pointing direction adjusting method of the roadside apparatus may include the following steps. First, identification information and signal strength information of multiple mobile vehicles are received. The identification information and the signal strength information are obtained by the RFID reader according to response signals of wireless identification tags of the multiple mobile vehicles (Step S902). Next, the multiple mobile vehicles are identified and the positions of the multiple mobile vehicles are determined according to the identification information and the signal strength information of the multiple mobile vehicles, and the communication beam is directed to the multiple mobile vehicles (Step S904). Finally, communication bandwidths are allocated to the multiple mobile vehicles (Step S906).

In summary, the embodiments of the disclosure use the RFID reader to detect the response signal of the wireless identification tag of the mobile vehicle. The roadside unit may determine the position of the mobile vehicle according to the signal strength information of the response signal, and direct the communication beam to the mobile vehicle. In this way, the position of the mobile vehicle may be determined according to the signal strength information of the response signal provided by the RFID reader, so that the mobile vehicle may be effectively located. There is no need to set multiple antennas on the mobile vehicle and perform complex mathematical computation as in the prior art. Therefore, the hardware cost can be effectively reduced, and the communication beam of the roadside unit may be immediately directed to the mobile vehicle, thereby greatly improving the communication quality. In some embodiments, the roadside unit may determine the position of the mobile vehicle according to the identification information and the signal strength information provided by the multiple RFID readers to accurately track the positional change of the first mobile vehicle, thereby more accurately directing the communication beam of the roadside unit to the mobile vehicle. In addition, in other embodiments, the identification information and the mobile vehicle status information may also be provided to the adjacent roadside unit, so that the adjacent roadside unit may more accurately predict the movement status of the mobile vehicle according to the identification information and the mobile vehicle status information.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be determined by the scope of the appended claims.

What is claimed is:

1. A roadside apparatus, comprising:
a first radio frequency identification reader, for detecting a first response signal of a wireless identification tag of a first mobile vehicle to obtain first signal strength information and identification information, wherein the first signal strength information corresponds to strength of the first response signal;
a first roadside unit, coupled to the first radio frequency identification reader, for determining a position of the first mobile vehicle according to the first signal strength information, and directing a communication beam of the first roadside unit to the first mobile vehicle, the first roadside unit further obtains mobile vehicle status information according to the first signal strength information; and
a second roadside unit, coupled to the first roadside unit, wherein the first roadside unit further transmits the identification information and the mobile vehicle status information of the first mobile vehicle to the second roadside unit, wherein the second roadside unit identifies the first mobile vehicle and predicts a movement status of the first mobile vehicle according to the identification information and the mobile vehicle status information of the first mobile vehicle.

2. The roadside apparatus according to claim 1, wherein the first roadside unit further identifies the first mobile vehicle according to the identification information of the first mobile vehicle.

3. The roadside apparatus according to claim 2, further comprising:
a second radio frequency identification reader, coupled to the first roadside unit, and detecting a second response signal of the radio identification tag of the first mobile vehicle to obtain the identification information and second signal strength information of the first mobile vehicle, wherein the second signal strength information corresponds to strength of the second response signal, and the first roadside unit identifies the first mobile vehicle and determines the position of the first mobile vehicle according to the identification information, the first signal strength information, and the second signal strength information of the first mobile vehicle.

4. The roadside apparatus according to claim 2, wherein the mobile vehicle status information comprises at least one of the position and a movement speed of the first mobile vehicle, and the movement speed is obtained by dividing a positional change of the first mobile vehicle by an elapsed time
wherein the second roadside unit further directs a communication beam of the second roadside unit to the first mobile vehicle according to a prediction result of the movement status of the first mobile vehicle.

5. The roadside apparatus according to claim 1, wherein the first roadside unit compares the first signal strength information with at least one signal strength preset value, and determines the position of the first mobile vehicle according to a comparison result.

6. A roadside apparatus, comprising:
a first radio frequency identification reader, for detecting a first response signal of a wireless identification tag of a first mobile vehicle to obtain first signal strength information, wherein the first signal strength information corresponds to strength of the first response signal; and
a first roadside unit, coupled to the first radio frequency identification reader, for determining a position of the first mobile vehicle according to the first signal strength information, and directing a communication beam of the first roadside unit to the first mobile vehicle, wherein the first radio frequency identification reader further detects a second response signal of a wireless identification tag of a second mobile vehicle to obtain second signal strength information, the second signal strength information corresponds to strength of the second response signal, and the first roadside unit further determines a position of the second mobile vehicle according to the second signal strength information, directs the communication beam of the first roadside unit to the second mobile vehicle, and allocates communication bandwidths to the first mobile vehicle and the second mobile vehicle.

7. A communication beam pointing direction adjusting method of a roadside apparatus, comprising:

receiving first signal strength information and identification information obtained by a first radio frequency identification reader detecting a first response signal of a wireless identification tag of a first mobile vehicle, wherein the first signal strength information corresponds to strength of the first response signal;

determining a position of the first mobile vehicle according to the first signal strength information, and directing a communication beam to the first mobile vehicle;

obtaining mobile vehicle status information according to the first signal strength information;

transmitting the identification information and the mobile vehicle status information of the first mobile vehicle to another roadside unit; and identifying the first mobile vehicle and predicting a movement status of the first mobile vehicle according to the identification information and the mobile vehicle status information of the first mobile vehicle.

8. The communication beam pointing direction adjusting method of the roadside apparatus according to claim 7, comprising:

identifying the first mobile vehicle according to the identification information of the first mobile vehicle.

9. The communication beam pointing direction adjusting method of the roadside apparatus according to claim 8, wherein the mobile vehicle status information comprises at least one of the position and a movement speed of the first mobile vehicle, and the movement speed is obtained by dividing a positional change of the first mobile vehicle by an elapsed time, wherein the communication beam pointing direction adjusting method further comprises:

directing a communication beam of the another roadside unit to the first mobile vehicle according to a prediction result of the movement status of the first mobile vehicle by the another roadside unit.

10. The communication beam pointing direction adjusting method of the roadside apparatus according to claim 8, comprising:

receiving the identification information and second signal strength information of the first mobile vehicle obtained by a second radio frequency identification reader detecting a second response signal of the wireless identification tag of the first mobile vehicle, wherein the second signal strength information corresponds to strength of the second response signal; and identifying the first mobile vehicle and determining the position of the first mobile vehicle according to the identification information, the first signal strength information, and the second signal strength information of the first mobile vehicle.

11. The communication beam pointing direction adjusting method of the roadside apparatus according to claim 7, comprising:

comparing the first signal strength information with at least one signal strength preset value, and determining the position of the first mobile vehicle according to a comparison result.

12. The communication beam pointing direction adjusting method of the roadside apparatus according to claim 7, comprising:

receiving second signal strength information obtained by the first radio frequency identification reader detecting a second response signal of a wireless identification tag of a second mobile vehicle, wherein the second signal strength information corresponds to strength of the second response signal;

determining a position of the second mobile vehicle according to the second signal strength information, and directing the communication beam to the second mobile vehicle; and allocating communication bandwidths to the first mobile vehicle and the second mobile vehicle.

* * * * *